Figure 1:
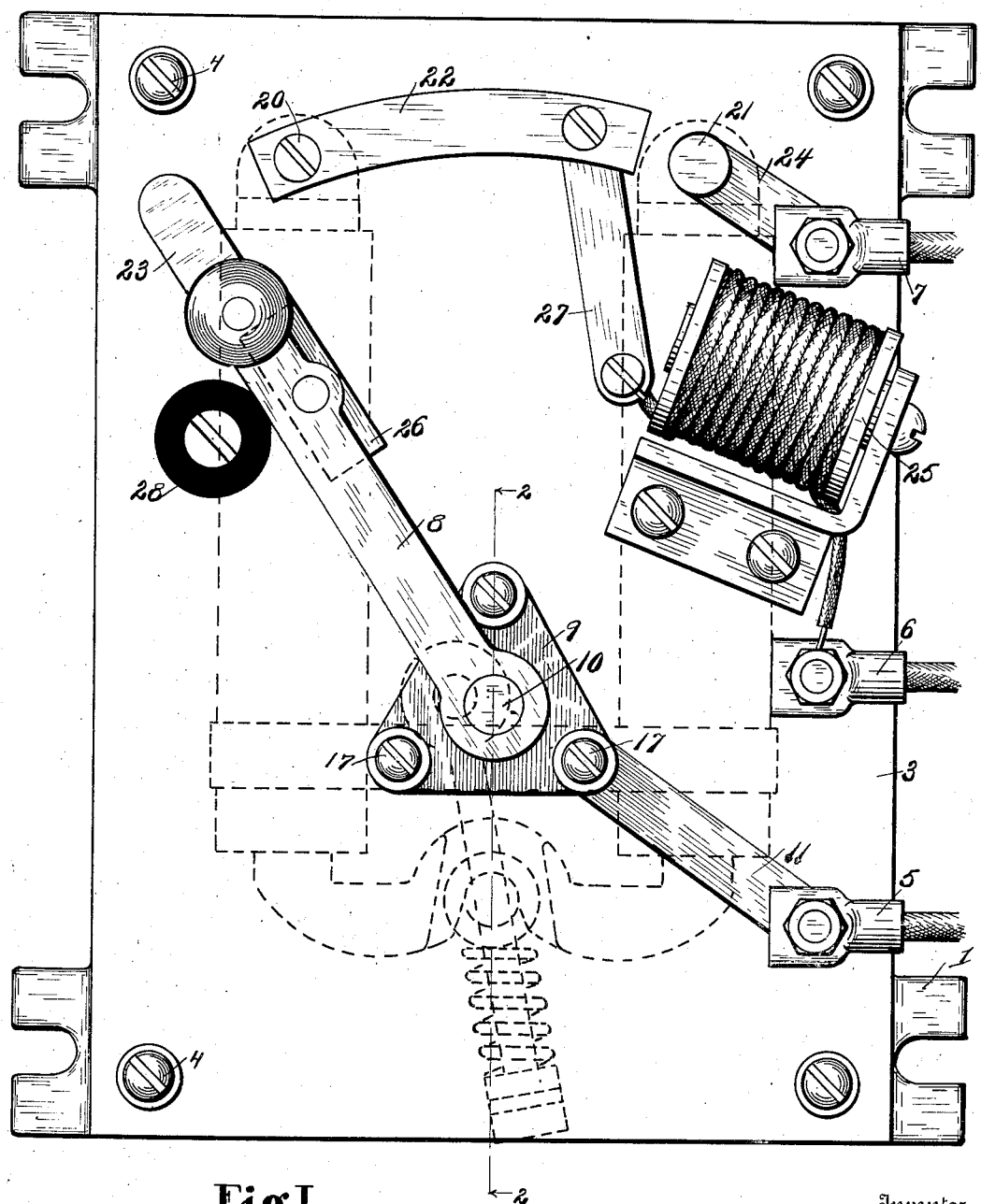
Figure 2:
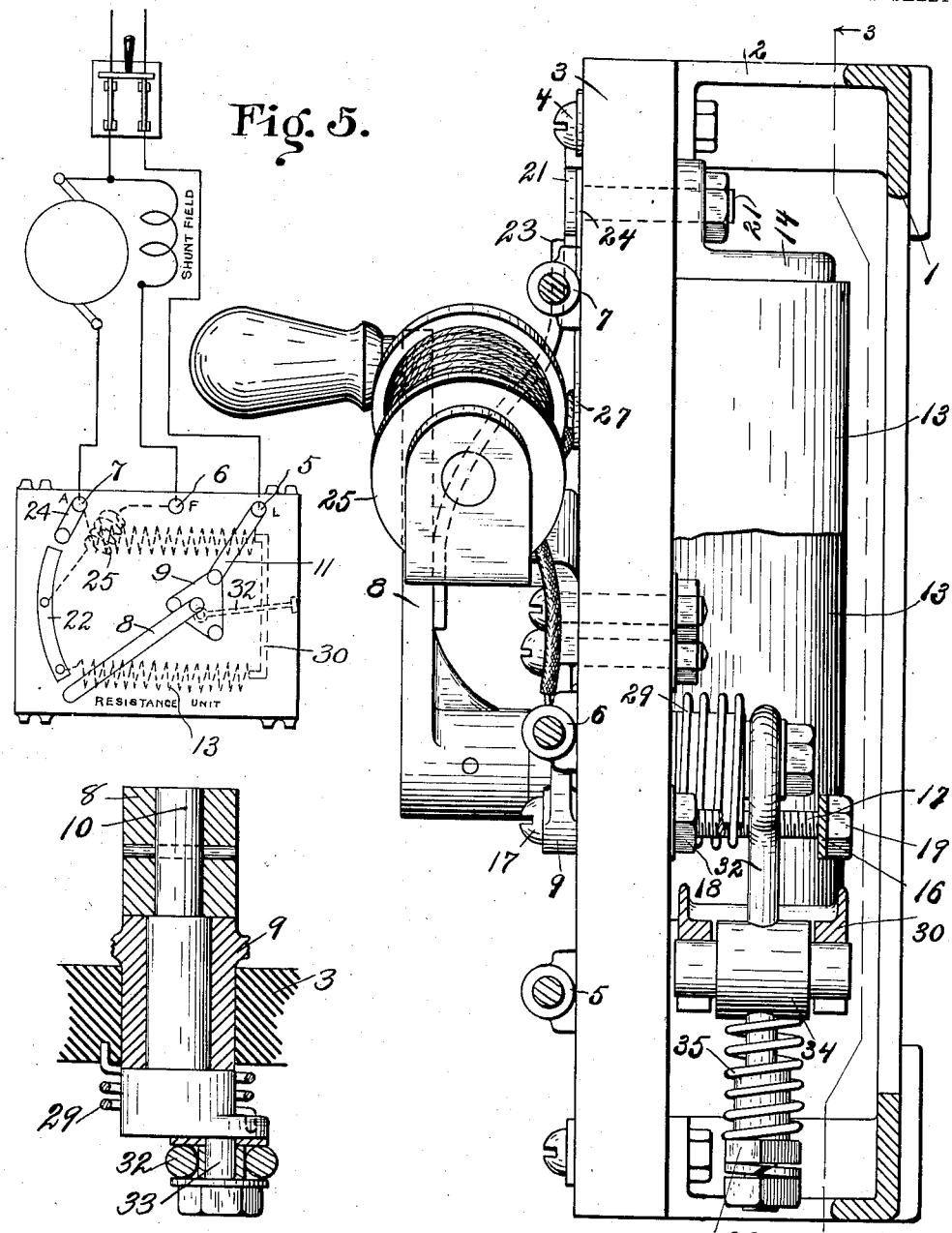
Figure 3:
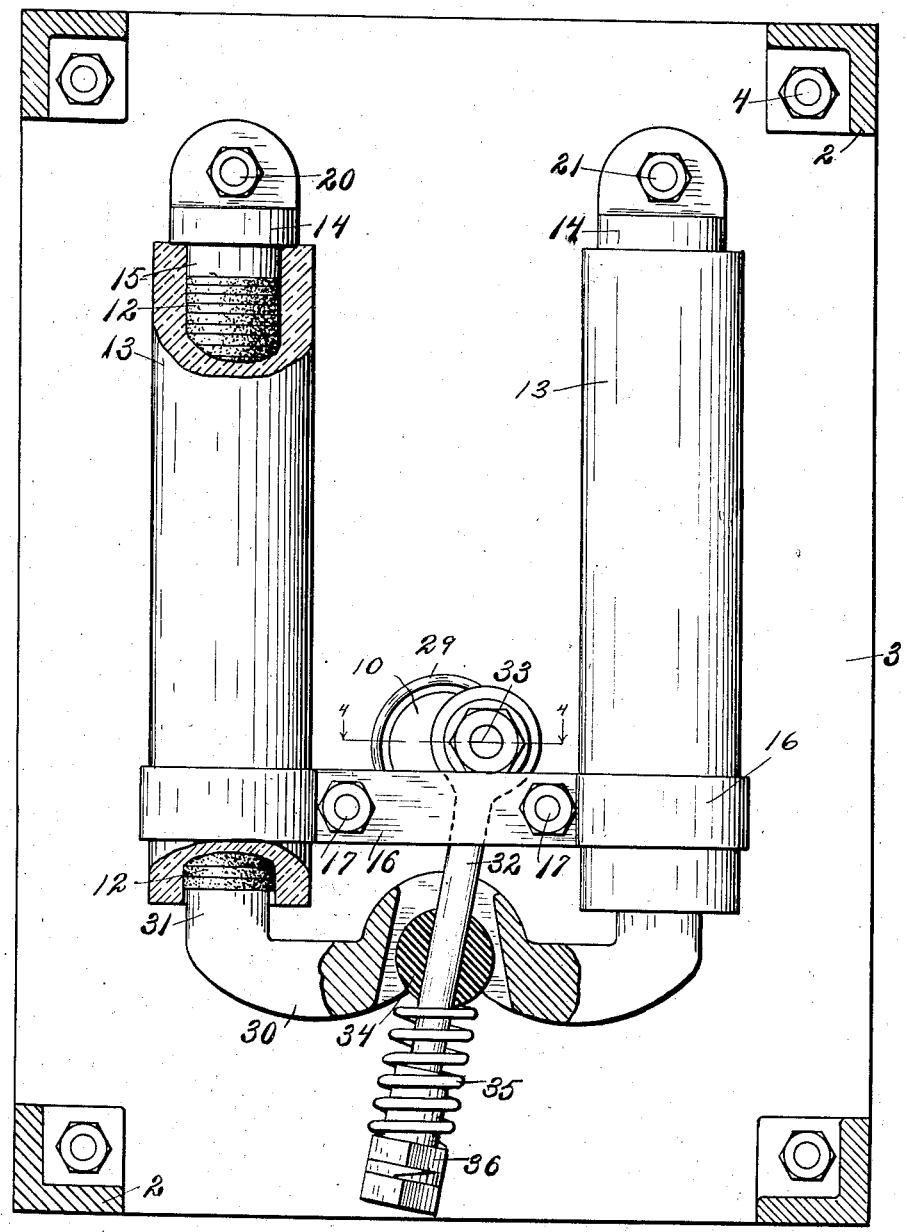

Fig. I.

UNITED STATES PATENT OFFICE.

GEORGE G. THOMPSON, OF MUSKEGON, MICHIGAN, ASSIGNOR TO AMERICAN ELECTRIC FUSE COMPANY, OF MUSKEGON, MICHIGAN.

MOTOR-STARTER OR ELECTRIC-CIRCUIT CONTROLLER.

992,294.  Specification of Letters Patent.  Patented May 16, 1911.

Application filed December 31, 1910. Serial No. 600,308.

*To all whom it may concern:*

Be it known that I, GEORGE G. THOMPSON, a citizen of the United States, residing at Muskegon, Michigan, have invented certain new and useful Improvements in Motor-Starters or Electric-Circuit Controllers, of which the following is a specification.

This invention relates to improvements in motor starters or electric circuit controllers. The main object of this invention is to provide an improved motor starter or electric circuit controller which is very simple and economical in structure, very durable and one which is not likely to get out of repair in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this invention, in which:

Figure I is a front view of a motor starter embodying the features of my invention. Fig. II is a side view looking from the right of Fig. I, parts being in section and other parts broken away to better show the structural details, the section parts being on a central longitudinal line. Fig. III is an inside view, partially in section, on a line corresponding to line 3—3 of Fig. II, parts being broken away to better show structural details. Fig. IV is an enlarged detail, partially in section, on a line corresponding to line 4—4 of Fig. III. Fig. V is a diagrammatic view showing the circuit connections for the controller, the field and armature of the motor, the parts being illustrated in conventional form.

In the drawing, similar reference characters refer to similar parts throughout the several views, and the sectional views are taken looking in the direction of the little arrows at the ends of the section lines.

Referring to the drawing, the frame 1 is provided with corner posts 2 on which the top plate 3 is mounted, as by means of the bolts 4. This top plate is preferably formed of insulating material, as the necessity of otherwise insulating the parts mounted thereon is avoided. Terminal couplings 5, 6 and 7, for the line shunt field and controlled circuit wires, are mounted on the top plate, as shown in Fig. I. The control lever 8 is mounted on the bearing plate 9, the shaft 10 for the lever being arranged through the plate 3. The plate 9 is electrically connected to the line circuit terminal 5, as by means of the strap 11.

The structure illustrated is provided with a pair of resistance elements, comprising resistance medium disks 12 and tubular containers 13 therefor. These containers are formed of quartz, porcelain, lava or any fictile material having high heat resisting and insulating qualities. I prefer, however, a special form of porcelain having high heat resisting qualities. These containers are rigidly supported by means of the brackets 14, having cylindrical studs 15 projecting into the inner ends of the containers, as shown in Fig. III, the inner ends of the containers being shouldered against the brackets. The outer ends of the containers are supported by a yoke-like bar 16, which is mounted on the bolts 17 depending from the supporting plate 3. These bolts are also preferably adapted to secure the plate 9, the bolts being provided with plate clamping nuts 18 and with bar supporting nuts 19. The brackets 14 are supported by bolts 20 and 21, arranged through the supporting plate. The bolt 20 is also adapted to secure the starting plate 22 and to form an electrical connection for the starting plate to the bracket, and through it to the resistance medium.

The lever 8 is provided with a contact spring 23, which coacts with the starting plate and with the bolt 21, which is adapted to serve as a lever contact member for the controlled circuit, it being electrically connected by the strap 24 to the controller circuit terminal coupling 7. A magnet 25 for retaining the lever in its closed or "on" position is provided. This magnet is commonly designated in structures of this type as a "voltage" release magnet. The lever 8 is provided with an armature 26. The magnet 25 is electrically connected as through the strap 27 to the starting plate 22, and also to the shunt field circuit terminal 6, as clearly appears in Fig. I. The lever, in its open or "off" position, rests against the stop 28. The lever is returned to its open or off position by means of the coiled spring 29, which is wound about the shaft 10 of the lever, one end being connected to the supporting plate 3, and the other to the lever, as clearly appears in Fig. IV. When the lever is released by the deënergizing of the magnet 25, this spring carries it back to its off position. The spring may be omitted and the device supported with the left hand side of Fig. I downward, so that the weight of the lever returns it to its off position. This lever 8 is also adapted to apply pressure to the resistance medium disks, the connections consisting of the equalizer bar 30, having contact ends 31 projecting into the containers to engage the outer disks therein. The bar, in the structure illustrated, is adapted to serve as an electrical connection for the two resistance elements, thus connecting them in series.

A link 32 is eccentrically connected to the lever, which is provided with a crank pin 33. The link is slidably arranged through the equalizer bar pivot member 34. On the outer end of the link is a spring 35, one end of the spring engaging the pivot member and its outer end resting against the retaining nut 36. When the lever is shifted to its on position, the equalizer bar is lifted to compress the resistance medium, gradually cutting out the resistance as the resistance medium is compressed.

When the lever contact member 23 engages with the starting plate, the current flows from the line circuit through the lever, the starting plate, the first resistance element, the equalizer bar and the second resistance element to the controlled circuit, the resistance being gradually cut out or reduced as the resistance medium is compressed. When the lever is in its completely closed or "on" position, it engages the contact member 21, and the current flows directly through the lever and this contact member to the controlled circuit, the shunt current flowing through the magnet, the starting plate and the resistance elements. In the event of a cessation of the current, the magnet 25 is deënergized and the lever opens, and the current is entirely cut off until the starter is again operated.

The containers 13 are preferably formed of porcelain, as stated, on account of the insulating and heat resisting qualities thereof, and on account of the economy with which they may be produced.

The means for applying pressure to the resistance medium is arranged so that the containers are not subjected to lateral strains. This is of importance, as otherwise frequent renewals might be required. The resistance elements are connected in series and by the equalizer bar, equalized pressure is delivered thereto. I have, in my accompanying drawing, shown only a pair of resistance elements or units, but these can be multiplied as occasion requires, the means for applying pressure being modified to meet the requirements.

I have illustrated and described my improvements in details in a simple embodiment. I am aware, however, that the same is capable of considerable variations without departing from my invention and I desire to be understood as claiming the same specifically in the form illustrated, as well as broadly within the scope of the appended claims.

Having thus described my invention, what I claim as new and desire to secure by Letters Patent is:

1. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for supporting said resistance element containers on the inner side of said supporting plate comprising a yoke-like supporting bar for their outer ends and brackets having studs projecting into their inner ends, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever; a return spring for said control lever; a magnet for said lever electrically connected to said starting plate and the field shunt circuit; an equalizer bar having its ends projecting into said containers to engage the disks therein, said equalizer bar being adapted to serve as an electrical connection for the resistance elements; a link eccentrically connected to said lever; a pivot member for said bar through which said link is slidably arranged; and a pressure spring arranged on the outer end of said link to engage the said pivot member.

2. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for supporting said resistance element containers on the inner side of said supporting plate comprising a yoke-like supporting bar for their outer ends and brackets having studs projecting into their inner ends, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever; a magnet for said lever electrically connected to said starting plate and the field shunt circuit; an equalizer bar having its ends projecting into said containers to engage the disks therein, said equalizer bar being adapted to serve as an electrical connection for the resistance elements; and connections for said equalizer bar to said lever.

3. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for supporting said resistance element containers on the inner side of said supporting plate; a magnet for said lever electrically connected to said starting plate and the field shunt circuit; an equalizer bar having its ends projecting into said containers to engage the disks therein, said equalizer bar being adapted to serve as an electrical connection for the resistance elements; a link eccentrically connected to said lever; a pivot member for said bar through which said link is slidably arranged; and a pressure spring arranged on the outer end of said link to engage the said pivot member.

4. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for supporting said resistance element containers on the inner side of said supporting plate; a magnet for said lever electrically connected to said starting plate and the field shunt circuit; an equalizer bar having its ends projecting into said containers to engage the disks therein, said equalizer bar being adapted to serve as an electrical connection for the resistance elements; and connections for said equalizer bar to said lever.

5. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate comprising a yoke-like supporting bar for their outer ends and brackets having studs projecting into their inner ends, said brackets being supported by bolts arranged through said supporting plate, the bolt for the bracket of the first resistance element being adapted to serve as a securing member for said starting plate and to form electrical connections therefor to the bracket, the bolt for the other bracket being connected to the controlled circuit and adapted to serve as a contact member for said control lever; means for compressing said resistance medium comprising an equalizer bar, a link eccentrically connected to said lever, a pivot member for said bar through which said link is slidably arranged, and a pressure spring arranged on the outer end of said link to engage the said pivot member.

6. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate comprising a yoke-like supporting bar for their outer ends and brackets having studs projecting into their inner ends, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever; means for compressing said resistance medium comprising an equalizer bar, and connections for said bar to said lever.

7. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate comprising a yoke-like supporting bar for the outer ends and brackets having studs projecting into their inner ends, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever; a magnet for said lever electrically connected to said starting plate and the shunt field circuit; means for compressing said resistance medium comprising an equalizer bar, and connections for said bar to said lever.

8. In an electric current controller, the combination with a supporting plate, of a pair of resistance elements comprising piles or columns of resistance medium disks and tubular porcelain containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate; a magnet for said lever electrically connected to said starting plate and the shunt field circuit; means for compressing said resistance medium comprising an equalizer bar, and connections for said bar to said lever.

9. In an electric current controller, the combination with a supporting plate, of a pair of resistance elements comprising piles or columns of resistance medium disks and tubular porcelain containers therefor; a control lever mounted on the outer side of said plate and electrically connected with the line circuit; a starting plate arranged on the outer side of said supporting plate to coact with said control lever; and means for rigidly supporting said resistance element containers on the inner side of said supporting plate comprising a yoke-like supporting bar for the outer ends and brackets having studs projecting into their inner ends, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever.

10. In an electric current controller, the combination with a supporting plate, of a pair of resistance elements comprising piles or columns of resistance medium disks and tubular porcelain containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate comprising brackets having disk-contact members thereon, said brackets being supported by bolts arranged through said supporting plate, the bolt for the bracket of the first resistance element being adapted to serve as a securing member for said starting plate and to form an electrical connection therefor to the bracket, the bolt for the other bracket being connected to the controlled circuit and adapted to serve as a contact member for said control lever; means for compressing the resistance medium comprising an equalized bar; and connections for said bar to said lever.

11. In an electric current controller, the combination with a supporting plate, of a pair of resistance elements comprising piles or columns of resistance medium disks and tubular porcelain containers therefor; a control lever mounted on the outer side of said plate and electrically connected with the line cicuit; a starting plate arranged on the outer side of said supporting plate to coact with said control lever; means for rigidly supporting said resistance element containers on the inner side of said supporting plate comprising brackets having disk contact members thereon, said brackets being supported by bolts arranged through said supporting plate, the bolt for the bracket of the first resistance element being adapted to serve as a securing member for said starting plate and to form an electrical connection therefor to the controlled circuit and adapted to serve as a contact member for said control lever; and means for compressing the resistance medium.

12. In an electric current controller, the combination with a supporting plate, of a pair of resistance elements comprising piles or columns of resistance medium disks and tubular containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate; means for compressing the resistance medium comprising an equalizer bar; and connections for said bar to said lever.

13. In an electric current controller, the combination with a supporting plate, of a pair of resistance elements comprising piles or columns of resistance medium disks and tubular porcelain containers therefor; a control lever mounted on the outer side of said plate and electrically connected with the line circuit; a starting plate arranged on the outer side of said supporting plate to coact with said control lever; means for rigidly supporting said resistance element containers on the inner side of said supporting plate; and means for compressing the resistance medium.

14. In an electric current controller, the combination of a pair of resistance elements comprising piles or columns of resistance medium disks and supports therefor; and means for applying pressure to said resistance medium disks comprising an equalizer bar having its ends projecting into said containers to engage the disks therein; a lever; a link eccentrically connected to said lever; a pivot member for said bar through which said link is slidably arranged; and a pressure spring arranged on the outer end of said link to engage said pivot member.

15. In an electric current controller, the combination of a pair of resistance elements comprising piles or columns of resistance medium disks and supports therefor; means for applying pressure to said resistance medium disks comprising an equalizer bar, a lever, a link eccentrically connected to said lever, a pivot member for said bar through which said link is slidably arranged, and a pressure spring arranged on the outer end of said link to engage said pivot member.

16. In an electric current controller, the combination of a plurality of resistance elements connected in series, comprising piles or columns of resistance medium disks and supports therefor; a control lever electrically connected with the line circuit; a starting plate arranged to coact with said control lever electrically connected with the first of said resistance elements, the last element being electrically connected to the controlled circuit; a controlled circuit contact for said lever; a magnet for said lever electrically connected with said starting plate and with a field circuit; and means actuated through said control lever for applying equalized pressure to said resistance medium.

17. In an electric current controller, the combination of a plurality of resistance elements connected in series, so that the current passes through them successively, comprising piles or colums of resistance medium disks and supports therefor; a control lever electrically connected with the line circuit; a starting plate arranged to coact with said control lever electrically connected with the first of said resistance elements, the last element being electrically connected to the controlled circuit; a controlled circuit contact for said lever; and means actuated through said control lever for applying equalized pressure to said resistance medium.

18. In an electric current controller, the combination with a supporting plate, of resistance elements comprising piles or columns of resistance medium disks and supports therefor; a control lever mounted on the outer side of said plate and electrically connected with the line circuit; a starting plate arranged on the outer side of said supporting plate to coact with said control lever; means for supporting said resistance element supports on the inner side of said supporting plate; and means for compressing the resistance medium, said resistance elements being connected in series, the first being electrically connected to said starting plate and the last being electrically connected to the controlled circuit.

19. In an electric current controller, the combination of a pair of resistance elements comprising piles or columns of resistance disks and supports therefor; means for applying pressure to said resistance medium disks comprising an equalizer bar, a control lever, a link connected to said lever, and a pivot member for said bar to which said link is connected.

20. In an electric current controller, the combination of a pair of resistance elements connected in series so that the current passes through them successively, comprising piles or columns of resistance medium disks and supports therefor, a control lever electrically connected to the line circuit, a starting plate electrically connected with the first element, the last element being connected to the controlled circuit, and means for applying equalized pressure to said resistance element comprising an equalizer bar actuated by said control lever.

21. In an electric current controller, the combination of a pair of resistance elements connected in series so that the current passes through them successively, comprising piles or columns of resistance medium disks and supports therefor, a control lever electrically connected to the line circuit, a starting plate electrically connected with the first element, the last element being connected to the controlled circuit, a controlled circuit contact for said lever, and means for applying equalized pressure to said resistance medium disks actuated by said control lever.

22. In an electric current controller, the combination with the supporting plate, of a pair of resistance elements comprising resistance medium disks and tubular containers therefor; means for rigidly supporting said resistance element containers comprising brackets having studs projecting into and fitting their inner ends; a yoke-like supporting bar for their outer ends; and means for applying pressure to said resistance medium disks comprising a lever, an equalizer bar acting on said resistance medium disks, and a link connecting said bar to said lever.

23. In an electric current controller, the combination with the supporting plate, of a pair of resistance medium elements comprising resistance medium disks and tubular containers therefor; means for rigidly supporting said resistance element containers comprising brackets having studs projecting into their inner ends and means for applying pressure to said resistance medium disks comprising an equalizer bar having contact ends projecting into the containers to engage the disks therein.

24. In an electric current controller, the combination with the supporting plate, of a pair of resistance elements comprising piles or columns of resistance medium disks and supports therefor; a control lever mounted on the outer side of said plate and electrically connected to the line circuit; a starting plate arranged on the outer side of said supporting plate to coact with said control lever; means for supporting said resistance medium disk supports comprising brackets supported by bolts arranged through said starting plate, the bolt for the bracket of the first resistance element being adapted to serve as a securing member for said starting plate and to form an electrical connection to the bracket, the bolt for the other bracket being connected to the controlled circuit and adapted to serve as a contact member for the control lever; and means actuated by said lever for applying pressure to said resistance medium disks.

In witness whereof, I have hereunto set my hand and seal in the presence of two witnesses.

GEORGE G. THOMPSON. [L. S.]

Witnesses:
   C. C. CLEVERDON,
   R. J. ROTE.